(No Model.)
A. T. SANGSTON.
NUT LOCK.
No. 403,386. Patented May 14, 1889.
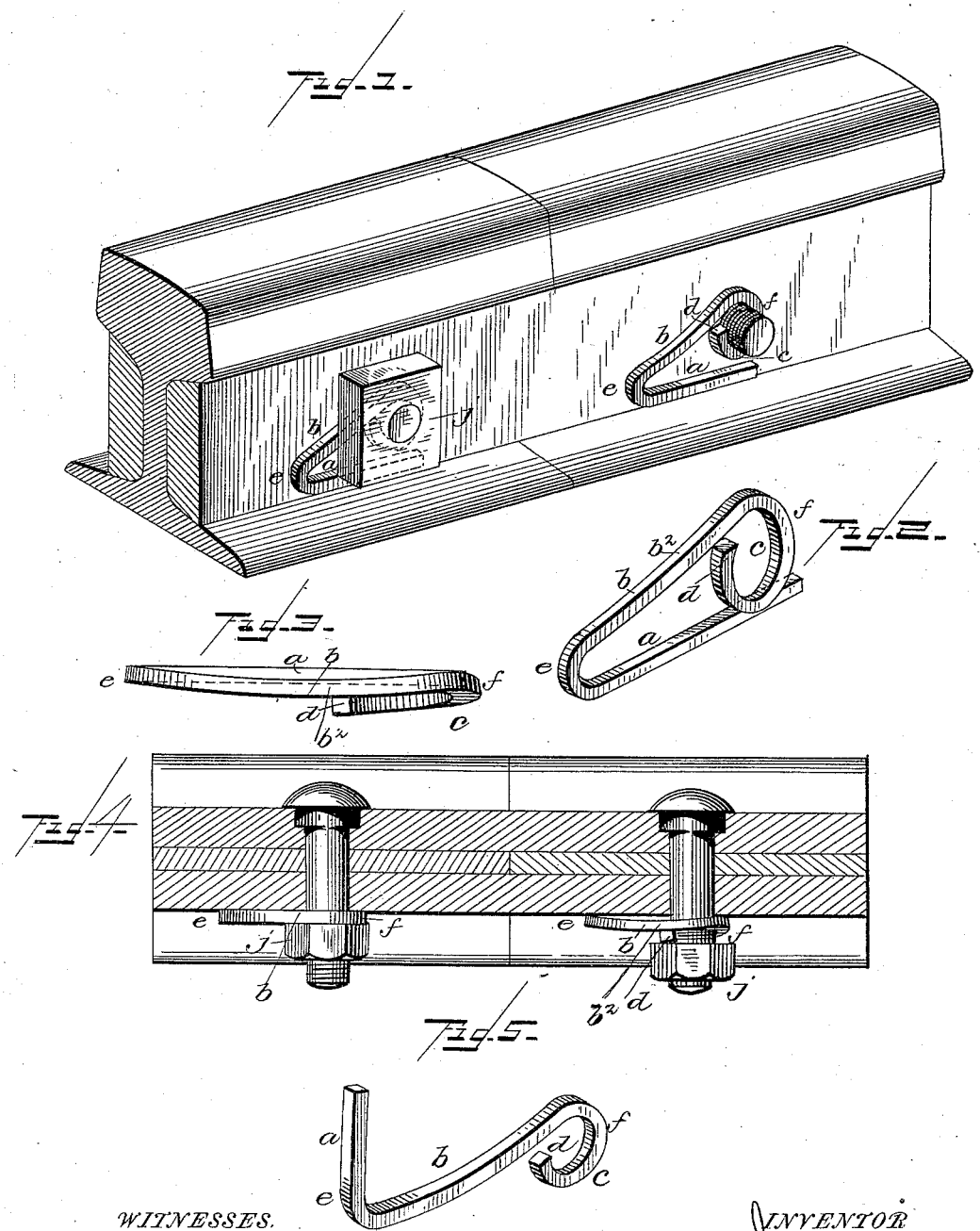
WITNESSES.
F. L. Ourand
Herbert L. Davis
INVENTOR
Allan T. Sangston
By Johnson and Johnson
his Attorneys.

UNITED STATES PATENT OFFICE.

ALLAN T. SANGSTON, OF PHILADELPHIA, PENNSYLVANIA.

NUT-LOCK.

SPECIFICATION forming part of Letters Patent No. 403,386, dated May 14, 1889.

Application filed August 27, 1888. Serial No. 283,911. (No model.)

*To all whom it may concern:*

Be it known that I, ALLAN T. SANGSTON, a citizen of the United States, residing at Philadelphia, in the county of Philadelphia and State of Pennsylvania, have invented new and useful Improvements in Nut-Locks, of which the following is a specification.

I have improved the helical-spring device for locking the nuts of screw-bolts to prevent the unscrewing of the nut; and my improved nut-lock is specially designed for the single bolts of railway-joints, in which the locking device itself may be prevented from turning upon the bolt by abutting either upon the base of the rail or against the T-head thereof.

The precise improvement which I have made resides in the peculiar form of the device, whereby, in addition to the usual locking-point formed by the biting end of the helical coil or eye part upon the inner face of the nut, a second or supplemental outwardly-standing bow locking-spring is formed in a part passing over the said coil-biting point, so as to form a bearing upon the inner face of the nut at or near the biting end point of the coil. By this construction the single coil-lock is caused to bear with spring force at two separate and distinct contiguous points upon the inner face of the nut when the latter is screwed home, and thus form a simple and efficient single nut-locking device in which the separate locking-points each form a separate spring, both acting upon the inner face of the nut at contiguous points, and both acting with a spring force against the nut, which increases as the nut is screwed home. By this construction two springs are formed, one by a helical bend having a biting-point, and the other by an outwardly-bowed part crossing over and outside of the end of the said helical biting-point. This construction gives the advantage of compactness with two integral springs, one supplementing the other, and both acting in the same direction against the inner face of the nut, both exerting an independent spring force at practically the same point upon the nut, binding it and locking it upon the threads of the bolt.

The accompanying drawings illustrate my improved nut-locking device, in which—

Figure 1 is a view in perspective of the rail-joint parts, showing my improved nut-locking device as applied to the bolts and to the nuts thereof; Fig. 2, a perspective view of the nut-locking device, and Fig. 3 a top edge view more clearly showing the bow-locking spring part; Fig. 4, a horizontal section taken through the rail-joint nut-locking devices, showing one of the nuts screwed home compressing the two springs and the nut of the other bolt not screwed home, to show the relation and action of the coil and bow springs. Fig. 5 is a modified form of my improved nut-locking spring.

The locking device is adapted for use with the ordinary bolts and nuts.

A piece of square rod is formed with a straight arm part, $a$, from which a part, $b$, extends obliquely to form a bow-spring, (looking at it from the top edgewise,) the said bow terminating in a helical spring-coil part, $c$, standing outward from the fish-plate, and the coil $c$ forms the helical spring part, which terminates in the biting end $d$, while the oblique part $b$ extending therefrom forms a bow, looking at its edge, as shown in Fig. 3, standing outward from the fish-plate. This bow part forms a spring-bar extending from the coil $c$ to the non-spring arm part $a$, so that it will cross the biting end $d$ of the coil at about the middle $b^2$ of the bow. The two springs are thus formed between two points, $e$ and $f$, which bear upon the face of the fish-plate, as shown in Fig. 4. These bearing-points $e$ and $f$ are formed by the ends of the bow, and the biting-point $d$ stands out from the side of the bow a distance about equal to the thickness of the square rod, as shown in Fig. 3, so that the spring of the coil extends from $d$ to $f$, while the spring of the bow extends from $e$ to $f$, and both exert their force against the inner side of the nut at about the same point.

The arm part $a$ may be horizontal and extend under the coil $c$ to bear upon the base of the rail or the base of the fish-bar; or it may extend up to bear against the T-head of the rail to prevent the nut-locking device from turning upon the bolt in screwing the nut on or off, as seen in Fig. 5.

The bolt is prevented from turning in the usual manner.

The device is fitted against the fish-bar with its coiled end upon the bolt, and the nut J is screwed upon the bolt against the coil-point $d$ and compresses it flush with the outer side of the bow-spring part $b$, the nut then bearing upon the latter at $b^2$, and compressing it so as to straighten against the fish-plate, and thus bring into action the force of these two spring parts, both co-operating to bind the nut upon the bolt, so that it cannot turn thereon. In this way the spring force of the helical part $c$ is supplemented by the spring force of the outwardly bow part to lock the nut upon the bolt, while the device itself is locked by the bent arm $a$ at the end of the bow.

The object of the re-enforcing action of the bow part of the spring is to guard against the possible loosening of the nut over the biting-point of the coil, because in such event the nut could not work over the bowed bearing $b^2$ at the same time.

Single and double nut-lock bars formed with two springs of various constructions have been proposed, and such single nut-locks have been fastened to the rail and to the angle-bar in various ways to prevent them from turning; but, so far as I know and can find, the precise improvement set out in my claim forms a novel device in which the two separate and distinct springs co-operate to lock the nut in the way described.

I claim—

The improved single nut-lock bar herein described, formed with two independent springs, one in the eye-coil embracing the bolt and one in a bow-arm extending over and outside of the end of the eye-locking point, bringing both locking-points of the separate springs in opposite contiguous relation, one projecting outwardly beyond the other, and the bow-spring part terminating in the non-spring arm $a$, whereby the two independent locking-spring parts $d\ b^2$ are caused to act upon the inner face of the nut in the way shown and described.

In testimony whereof I have hereunto set my hand in the presence of two subscribing witnesses.

ALLAN T. SANGSTON.

Witnesses:
LOUIS J. BENTON,
ISAAC BANKS.